United States Patent [19]

Bloom et al.

[11] 4,209,330

[45] Jun. 24, 1980

[54] METHOD FOR FORMING CLUSTERS OF NOBLE METAL SILVER PRECIPITATING NUCLEI

[75] Inventors: Stanley M. Bloom, Waban; Boris Levy, Wayland, both of Mass.

[73] Assignee: Polaroid Corporation, Cambridge, Mass.

[21] Appl. No.: 897,944

[22] Filed: Apr. 4, 1978

Related U.S. Application Data

[63] Continuation-in-part of Ser. No. 649,201, Jan. 14, 1976.

[51] Int. Cl.[2] ........................ G03C 1/48; C03C 17/06; C09D 5/00; B01J 13/00

[52] U.S. Cl. ................................. 430/212; 23/305 R; 106/1.18; 106/1.21; 252/314; 252/358; 428/457; 428/539; 423/22; 423/23; 423/42; 423/43; 423/99; 423/101; 423/138; 423/140; 423/274

[58] Field of Search ............. 96/76 R, 119 R; 23/305; 423/274, 22, 23, 42, 43, 101, 99, 140, 138; 428/539, 457; 106/1.18, 1.21; 252/358, 314

[56] References Cited

U.S. PATENT DOCUMENTS

| | | | |
|---|---|---|---|
| 2,698,236 | 12/1954 | Land | 96/76 R |
| 3,647,440 | 3/1972 | Rasch | 96/76 R |

*Primary Examiner*—Richard L. Schilling
*Attorney, Agent, or Firm*—Philip G. Kiely

[57] ABSTRACT

Clusters or galaxies of noble metal silver-precipitating nuclei for use in silver diffusion transfer processes are formed by reducing a noble metal salt or complex to form a colloid of noble metal nuclei and inducing instability to said colloid, whereby said galaxies are formed.

8 Claims, No Drawings

METHOD FOR FORMING CLUSTERS OF NOBLE METAL SILVER PRECIPITATING NUCLEI

CROSS REFERENCES TO RELATED APPLICATIONS

This application is a continuation-in-part of copending application Ser. No. 649,201, filed Jan. 14, 1976.

BACKGROUND OF THE INVENTION

It is known in the art that a silver diffusion transfer process may provide a positive silver transfer image by development of the latent image provided by a photosensitive silver halide emulsion by exposure and, substantially contemporaneous with development, a soluble silver complex is obtained by reaction of a silver halide solvent with unexposed and undeveloped silver halide in the emulsion. The resultant soluble silver complex is at least in part transported in the direction of a suitable print-receiving element and the silver of the complex is there precipitated on silver-precipitating nuclei to provide the requisite positive silver image formation.

As set forth in U.S. Pat. No. 2,698,236 the array of silver atoms precipitated in the image-receiving element is influenced by the size of the silver-precipitating nuclei. If the silver precipitating nuclei are relatively small, the silver deposited thereon will be of a corresponding size and, therefore, generally red in color which is undesirable. Clusters or galaxies of silver-precipitating nuclei possessing a diameter directly proportional to the mass of image silver to be precipitated therein are disposed in the image-receiving layer to cause silver to precipitate in association with silver-precipitating nuclei clusters with a required density and of a size directly related to the physical parameters of the clusters, thus providing the desired black silver image.

Nobel metal silver-precipitating nuclei are known to the art. U.S. Pat. Application Ser. No. 649,201 filed Jan. 14, 1976 discloses a method of forming such nuclei by the reduction of a noble metal salt or complex. U.S. Pat. No. 3,647,440 also discloses noble metal silver-precipitating nuclei obtained by reducing a metal salt in the presence of the colloid with a reducing agent having a standard potential more negative than −0.30.

The present invention provides a novel method for forming the above-mentioned clusters or galaxies of noble metal silver-precipitating nuclei.

Copending application Ser. No. 649,201 also discloses the dialyzing of the colloid formed by the reduction of the noble metal salt before coating. The aforementioned application also discloses the precipitation of the noble metal by adjusting the pH of the colloid to an alkaline level whereby the nuclei can be separated, washed, redisposed in a polymer and coated.

SUMMARY OF THE INVENTION

The present invention is directed to a method of forming clusters of noble metal silver-precipitating nuclei. Noble metal nuclei formed by the reduction of noble metal salts or complexes in colloidal suspension are formed into clusters by causing an instability in the colloid, e.g., by adjusting the pH of the colloid solution to at least about 2.6. If desired, the clusters may be employed at this point either by suitable separation techniques or by the addition of a bulking polymer to the colloid to impart stability to the clusters. If a separation technique is employed, the clusters may be allowed to floc, whereupon separation of the floc may be carried out by filtering and the like, and then redispersing the flocced particles in a suitable polymer binder with, preferably, sonification, and coating the thus-formed polymer/cluster mixture which may be coated on a support to provide an image-receiving element.

DETAILED DESCRIPTION OF THE INVENTION

The novel method of the present invention is directed to the formation of clusters or galaxies of noble metal silver-precipitating nuclei formed by the reduction of a noble metal salt or complex. The terms "clusters" and "galaxies" are intended to be used interchangeably in the present application and refer to the aggregation of colloidal particles into a preselected diameter. The effect of the galaxy formation in a silver-precipitating diffusion transfer image-receiving layer is to provide a positive silver image of the proper color.

In carrying out the process of the present invention, a noble metal nuclei are formed by the reduction of a noble metal salt or complex. The nuclei at this point generally range from about 1 to 15 nm in particle size; more specifically about 5 nm. Instability is then induced in the colloid, resulting in the formation of clusters or galaxies of particles which generally range in size from about 75 to 150 nm. It should be noted that the aforementioned cluster size designation is an approximation since the clusters are irregular aggregations of the colloidal noble metal particles.

Preferably, the instability is introduced into the noble metal colloid by adjusting the pH from about 2.0 to at least about 2.6. At the higher pH level the clusters are formed. The clusters may then be handled as described above either by further agglomeration of the clusters resulting in a floccing-out of the noble metal nuclei clusters or by the direct addition of a bulking polymer to the clusters in the colloid at that point and employing the polymer/cluster mix directly as a coating to form a silver-precipitating image-receiving layer.

The pH adjustment may be accomplished either by dialyzing the colloid which will provide the aforementioned pH increase or by the addition of the appropriate base such as calcium carbonate to provide the pH elevation.

The preferred method of pH elevation to form clusters is by dialysis since the dialysis process also removes conductive species such as halide and alkaline earth ions. Concurrent with the pH adjustment, the conductivity drops from $\geqq 4{,}000$ μmhos to $\leqq 400$ μmhos.

Still another way of inducing the aforementioned instability to the colloid which results in the cluster formation is by heating the colloid sufficiently to cause floccing. Preferably, the colloid is heated to boiling. Subsequent to heating the nuclei flocs out and may then be treated in the same manner as described above with respect to the flocced clusters.

The following non-limiting examples illustrate the preparation of noble metal nuclei clusters within the scope of the present invention.

EXAMPLE 1

The following solutions were prepared:

Solution A 0.5 g. $SnCl_2 \cdot 2H_2O$ 100 g. 1.0% acetic acid
Water to make 100.5 g. total Solution B 10 g. 1% gelatin solution Solution C 0.286 g. $PdCl_2$
100 g. 2.0% acetic acid Dissolution carried out with stirring at about 40° C.

The nuclei were formed by bringing 145 g. of water to a boil in a flask with a magnetic stirrer. 20 g. of Solution A was added and, after one-half minute, 5 g. of Solution B. The mixture was allowed to come to a boil again and stirred vigorously while 20 g. of Solution C was added. After stirring for another one-half minute, the mixture was cooled to room temperature within five minutes. Sufficient water was then added to make up a total of 190 g.

The particle size of the palladium nuclei were found by electron microscopy to have a mean diameter of about 10 nm.

EXAMPLE 2

Palladium-containing fluid obtained in Example 1 was placed in a three inch dialysis tube and dialyzed against distilled water thereby removing conductive species. The pH of the fluid rose from about 2.0 to about 2.7. The conductivity dropped from about 4,000 $\mu$mhos to about 400 $\mu$mhos. When the aforementioned elevated pH range was reached the palladium flocced out on the bottom of the container. Electron microscopy showed the floc to comprise aggregates of clusters of particles with the clusters of about 100 nm in size.

EXAMPLE 3

Palladium-containing fluid obtained in Example 1 was boiled for about 3 hours whereupon the palladium flocced out. After cooling, electron microscopy showed the floc to comprise clusters or galaxies of particles about 100 nm in size.

EXAMPLE 4

To the palladium-containing fluid obtained in Example 1 was added sufficient calcium carbonate to raise the pH of the fluid to about 2.7 whereupon the palladium nuclei flocced out. Electron microscopy showed the floc to comprise clusters or galaxies of particles about 100 nm in size.

EXAMPLE 5

Palladium nuclei were prepared as in Example 1 except that three times the concentration of the reactants were employed. The thus-formed palladium nuclei colloid were then processed through a Cordis-Dow artificial kidney unit at a flow rate of about 100 ml/min with a distilled water dialysis rate of about 2 1/min. The pH of the fluid rose from about 2.0 to about 3.5. At this point, no floccing was evident. 100 times the weight of the colloid of gelatin was added. The thus-formed palladium nuclei-gelatin mix was then cast as a silver precipitating layer. Electron microscopy showed the clusters formed to be about 100 nm in size.

In Example 5, because of the great number and much reduced diameter of the dialysis tubes in the artificial kidney unit, dialysis occurs rapidly and efficiently as evidenced by the higher pH after dialysis. Formation of the clusters occurs without floculation, presumably due to the higher gelatin and stannous-chloride concentrations. When palladium-containing fluid prepared by the procedure of Example 1 was used in the kidney unit, floculation occurred in the tubes resulting in a severe reduction of flow rate, thus preventing recovery of the clusters.

It is known in the art to provide film units wherein silver-precipitating nuclei may be dispersed in the photosensitive silver halide emulsion layer. Thus, by processing an exposed film unit of this type, the positive image is formed in the emulsion layer.

Integral film assemblages essentially comprising an optical screen element and a photosensitive silver halide emulsion layer having silver-precipitating nuclei disposed therein are also known wherein the exposed and processed film unit contains a positive silver image derived from unexposed silver halide crystals possessing greater covering power than the negative silver image derived from exposed silver halide crystals. See, for example, U.S. Pat. Nos. 3,615,426 and 3,615,427.

Nuclei prepared according to the procedure of the present invention is particularly suitable for use in the film units set forth in the above indicated patents.

What is claimed is:

1. The method of forming clusters of noble metal silver-precipitating nuclei which comprises the steps of reducing a noble metal salt or complex to form a colloidal suspension of said nuclei and subsequently inducing instability into the thus-formed colloid whereby said clusters are formed.

2. The method as disposed in claim 1 wherein said instability is produced by raising the pH of said colloid from about 2 to at least about 2.6.

3. The method as defined in claim 1 wherein said instability in said colloid is produced by boiling said colloid.

4. The method as defined in claim 1 which includes the step of floccing the thus-formed clusters of silver precipitating nuclei and redispersing said floc in a polymeric binder material.

5. The method as defined in claim 1 wherein polymeric binder material is added to the colloid subsequent to the formation of the clusters.

6. The method as defined in claim 1 wherein said nuclei is about 1 to 15 nm and said clusters are about 10 times the particle size of said nuclei.

7. The method of claim 1 wherein said noble metal is palladium.

8. The method of claim 1 wherein said reduction is carried out with stannous chloride.

* * * * *